United States Patent Office 3,281,485
Patented Oct. 25, 1966

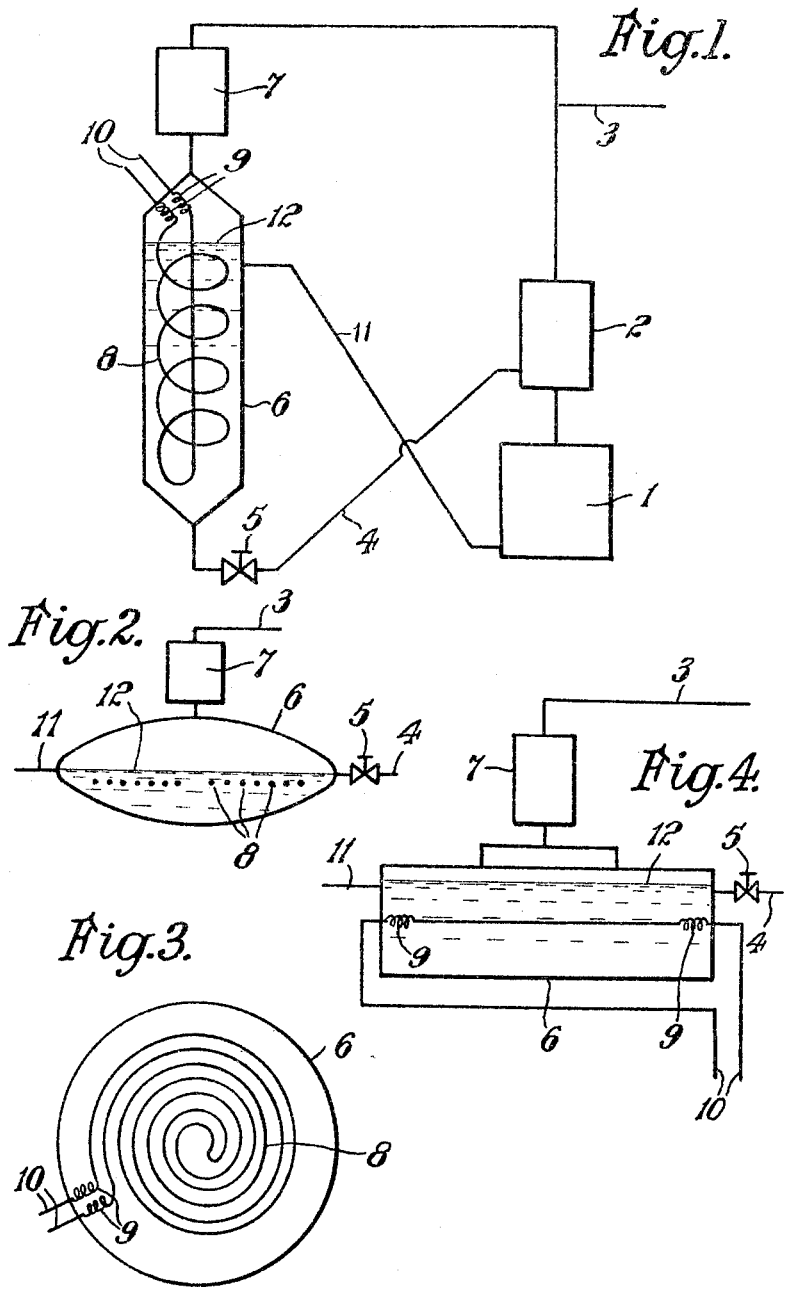

3,281,485
PRODUCTION OF TERPENE COMPOUNDS
Richard Lye Blackmore, London, England, assignor to Roberts A. Boake & Company Limited, London, England, a British company
Filed June 19, 1963, Ser. No. 289,134
Claims priority, application Great Britain, July 4, 1962, 25,627/62
7 Claims. (Cl. 260—677)

This invention relates to the production of certain terpene compounds by a method of pyrolysis.

The pyrolysis of many organic chemicals is at the present time carried out on an industrial scale, often by passing the pyrolysable compound in the gas phase through a pyrolysis zone, for example through a heated tube, pebble reactor or fluidized bed. With these procedures the residence times for the compound in the pyrolysis zone are relatively long so that any thermally unstable pyrolysate produced is not isolated in a significant yield. It has also been proposed to pyrolyse organic compounds in the liquid phase by the immersion of an electrically heated filament in the liquid compound. However, in this pyrolysis method little attempt has been made to minimise or control the period during which the pyrolysate, that is the resulting degradation product or products, are subjected to the pyrolysis temperature. Pyrolysis methods have, therefore, only found use on a commercial scale when the pyrolysate is relatively stable on heating. There are some pyrolysis reactions which have hitherto not been carried out, or carried out only in unsatisfactory yield, since the pyrolysate is thermally unstable, and there has been no satisfactory solution to the problem of cooling the pyrolysate molecules sufficiently quickly to a temperature at which they are not appreciably unstable, such cooling often being required to be carried out within a period of less than 10 milliseconds.

One particular example of such a pyrolysis process leading to a thermally unstable pyrolysate is the pyrolysis of α-pinene to produce by the fission of two carbon-carbon bonds the terpene hydrocarbon ocimene according to the reaction (expressed in conventional terpene nomenclature):

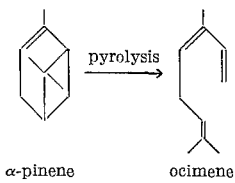

α-pinene     ocimene

It would be expected that this reaction would occur in view of the analogous pyrolysis of β-pinene to produce myrcene by the reaction:

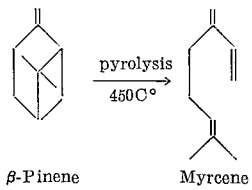

β-Pinene     Myrcene

However, pyrolysis of α-pinene at a relatively low temperature (400–450° C.) gives mainly dipentene (I) as the pyrolysate product resulting from only a single bond fission of the α-pinene molecule. Moreover, conventional pyrolysis at higher temperatures does not provide ocimene as expected, but the triply-conjugated hydrocarbon allo-ocimene (II) or a polymer thereof which readily forms because of the highly conjugated structure of allo-ocimene.

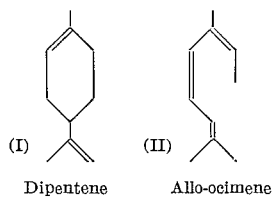

(I)     (II)

Dipentene     Allo-ocimene

The production of allo-ocimene rather than ocimene was explained by Hawkins and Hunt (J. Amer. Chem. Soc. 73 (1951), 5379–81) as due to the thermal isomerisation of the ocimene initially produced. Accordingly, they described the production of ocimene in an apparatus designed to minimise this thermal isomerisation. In this apparatus a stream of α-pinene vapour was caused to flow past a heated filament and within a short distance (about 7 mm.) impinge on a cooled surface. The unchanged α-pinene was then separated from the the pyrolysis products and recycled past the heated filament. In this way a yield of ocimene in the range of 25–37% was stated to have been obtained together with amounts of dipentene, allo-ocimene and polymers of allo-ocimene.

More recently Hawkins and Burris have reported (J. Org. Chem. 24 (1959), 1507–11) a further method for the production of ocimene by the pyrolysis of α-pinene. However, this method is also a pyrolysis carried out in the vapour phase and though reasonable yields of ocimene are stated to have been obtained the total amount of concomitantly formed dipentene and allo-ocimene always exceeded that of the ocimene. Thus, these workers had not solved the problem of obtaining a satisfactory two-bond fission of the α-pinene molecule, and moreover the apparatus which they describe for the process is only suitable for the pyrolysis of α-pinene on a small scale.

It has now been found that the yield of ocimene can be increased significantly so that it exceeds the total yield of dipentene and allo-ocimene concomitantly formed if a partial pyrolysis of α-pinene is carried out with the air of an element heated to at least 500° C. and immersed in a liquid environment comprising the α-pinene and the bulk of the liquid environment is maintained at a temperature below that at which appreciable isomerisation of the ocimene occurs. Such temperature is herein termed the "limiting" temperature and for ocimene it has now been found to be approximately 100° C.

The use of a heated element in a cool liquid environment permits the α-pinene molecules present therein to enter a pyrolysis zone situated near or on the surface of the element and there be heated to the pyrolysis temperature. Within a period of less than 10 milliseconds the "hot" ocimene molecules produced by the pyrolysis reaction re-enter the liquid environment and are there cooled to below the "limiting" temperature, that is to a temperature at which relatively few of the ocimene molecules isomerise. It is essential to carry out only a partial pyrolysis of the α-pinene so that the ocimene molecules formed are unlikely to re-enter the pyrolysis zone to any appreciable extent and thereby suffer isomerisation by reheating to a temperature at which they are unstable.

The general method of the invention is one of pyrolysing a pyrolysable compound wherein there is produced a thermally unstable pyrolysate, which comprises carrying out the partial pyrolysis of the pyrolysable compound in a liquid environment with the aid of an element immersed therein and heated to at least the pyrolysis temperature while maintaining the temperature of the bulk of the liquid environment below that at which appreciable change in the structure or composition of the composition of the pyrolysate occurs. Preferably, the bulk of the liquid environment is maintained under such reduced pressure that it is in a condition of ebullition.

In the general method of the invention the said liquid environment often initially consists substantially of the pyrolysable compound, though an inert liquid diluent can be present if desired. The general method can be employed not only for the pyrolysis of α-pinene to produce ocimene, but also for the pyrolysis of other terpene hydrocarbons to produce further terpene hydrocarbons of less cyclic structure, for instance for the pyrolysis of β-pinene to produce myrcene and pinane to produce 3,7-dimentyl-1,6-octadiene. In the pyrolysis of any compound by the general method of the invention it is only necessary to ascertain by simple experiment the required pyrolysis temperature to which the immersed element must be heated and a suitable temperature at which the bulk of the liquid environment can be maintained without appreciable change in the structure or composition of the pyrolysate occurring; it is, of course, not necessary to determine exactly the said "limiting" temperature in any particular instance.

The general method of the invention may be operated as a batch process in which the heated element is immersed in the liquid environment comprising the pyrolysable compound which is contained in a reaction chamber, the bulk of the environment being maintained below the said "limiting" temperature. For instance, the temperature of the environment may be controlled by internal or external cooling or by operation under reflux at such reduced pressure that the bulk of the liquid is maintained at the required temperature; this latter method of control is preferred since by it the bulk of the liquid environment is maintained in the desirable condition of ebullition. The duration of such a batch process is controlled in order to carry out only a partial pyrolysis of the pyrolysable compound and thereby inhibit appreciable change in the thermally unstable pyrolysate by molecules re-entering the pyrolysis zone surrounding the heated element. It is then customary to separate the pyrolysate from the reaction mixture, for example by a suitable solvent extraction technique or more preferably by distillation, if necessary at such reduced pressure that the pyrolysate is not heated to a temperature at which appreciable change in the structure or composition of the pyrolysate occurs.

However, the general method of the invention is preferably carried out on a semi-continuous or continuous basis by circulating the pyrolysable compound around a reaction system comprising a reaction chamber, wherein the said partial pyrolysis is carried out; and a separation zone, wherein unchanged pyrolysable compound is separated from the pyrolysate produced in the reaction chamber, the unchanged pyrolysable compound so separated being recycled to the reaction chamber. On a semi-continuous basis a single batch of the pyrolysable compound is treated in the reaction system with concentration of the formed pyrolysate at some part of it, while on a continuous basis there is a continuous supply of pyrolysable compound to the reaction system and a continuous bleed therefrom of the separated pyrolysate.

Though in some instances selective solvent extraction may be employed, a preferred method of separation of the mixture of pyrolysate and unchanged pyrolysable compound produced by the partial pyrolysis in the reaction chamber is by fractional distillation carried out at such temperature that appreciable change in the structure or composition of the pyrolysate does not occur. This is possible if the pyrolysable compound is ether the lowest or the highest boiling member of the mixture present after the partial pyrolysis, this mixture consisting of the pyrolysable compound, the pyrolysis products comprised in the pyrolysate, and any inert diluent present. In this distillation the pyrolysable compound is separated from the mixture and in the semi-continuous and continuous processes recycled to the reaction chamber. In the semi-continuous method the pyrolysate is concentrated in the separation zone, which is conveniently the fractionator pot of a distillation unit, or elsewhere in the reaction system, while in the continuous method the separated pyrolysate is removed from the system in the separation zone which in this instance is conveniently a fractionating column to which is supplied a feed-stream of the pyrolysable compound.

Whether the batch, semi-continuous or continuous procedure is employed, the size and shape of the reaction chamber, the nature and configuration of the heating element and its temperature are all factors affecting the efficiency of the present pyrolysis method as well as the average residence time of the pyrolysable liquid in the reaction chamber, which must be controlled to carry out only a partial pyrolysis and inhibit appreciable change in the thermally unstable pyrolysate by molecules re-entering the pyrolysis zone surrounding the heating element at the same time allowing a significant amount of pyrolysis to occur. In a semi-continuous or continuous method this residence time may be conveniently controlled by adjusting the flow rate of the pyrolysable liquid through the reaction chamber. The temperature of the heated element is at least as high as the pyrolysis temperature of the pyrolysable compound.

The element is conveniently heated electrically by either alternating or direct current. The configuration of the element is important in order to achieve the maximum yield of thermally unstable pyrolysate. Thus an element arranged in the reaction chamber substantially horizontally provides better results than one arranged vertically, probably because in this way renewed contact of the pyrolysis products with the heated element is minimised. Such renewed contact may also be inhibited by stirring the liquid in the reaction chamber for example by maintaining the liquid environment in a condition of ebullition or by bubbling therethrough an inert gas such as nitrogen. It is preferred that the element be of maximum length and it is therefore desirably in the form of a flat spiral or as a series of horizontal elements. However, a very loosely-coiled vertical helix has also been found to give equivalent results. Though the element itself during the process is surrounded by a surface film of vapour this film is thin and the element is accurately described as being in a liquid environment. The element may be in the form of a thin-walled tube. However, in practice it is often more convenient to use a metallic filament which is electrically heated to the required temperature. The nature of the metal employed to form such a filament is often not important and good results are often obtained with filaments of "Nichrome," nickel, tungsten and platinum. The thickness of the filament is often not critical, though it should not be so thin that it tends to fuse under the conditions of heating employed.

In the accompanying drawings FIG. 1 is a schematic illustration exemplifying apparatus for carrying out the pyrolysis method of the invention in a semi-continuous manner as hereinbefore described; FIG. 2 is a diagrammatic elevational cross-section of one modified form of reaction chamber for the apparatus of FIG. 1; FIG. 3 is a horizontal cross-section of the chamber shown in FIG. 2; and FIG. 4 is a diagrammatic illustration of another modified reaction chamber. Like parts in the several figures are denoted by like reference numerals.

The apparatus illustrated in FIG. 1 comprises a refluxing zone or fractionator pot 1 connected to a reflux condenser 2 and therethrough to a source of vacuum 3. From the condenser 2 a bleed pipe 4 leads through a regulating tap 5 to the reaction chamber 6 which is also connected to a reflux condenser 7 and to a source of vacuum, for convenience to the vacuum line 3. The reaction chamber contains the element 8 which is a wire filament in the form of a loosely-coiled vertical helix supported by tensioning devices 9 and connected to a source of electricity 10. The reaction chamber is also fitted with a return line 11 through which the reaction mixture is recycled to the refluxing zone 1 after an appropriate residence time in the reaction chamber which is determined by regulating the tap 5, the reflux rate in the zone 1 and the take-off ratio from the condenser 2 through the bleed pipe 4. The liquid level 12 in the reaction chamber 10 is substantially above the top of the filament 8.

The modified reaction chamber illustrated in FIGS. 2 and 3 is broad and shallow and the element 8 is in the form of a horizontal spiral filament. In FIG. 4, the reaction chamber is a substantially horizontal tube and the element is a straight wire filament axially disposed therein; more than one such filament can be contained in this type of reaction chamber if desired.

Whatever the form of reaction chamber and heating element, the liquid pyrolysable compound is caused to flow through the chamber at a suitable speed to provide a suitable residence time and during this flow pyrolysis occurs of some of the pyrolysable liquid. Each of the apparatus illustrated in the drawings is preferably arranged to operate at such a reduced pressure throughout that the liquid in the reaction chamber is in a condition of ebullition and the liquid in the refluxing zone is not heated to such temperature that appreciable change in the structure of the pyrolysate occurs.

The amount of current flowing in the heating element is that necessary to produce the necessary pyrolysis temperature, which, in practice, is often determined by the colour of the hot filament used as element.

In the pyrolysis of α-pinene according to the invention, it has now been found that the temperature of the bulk of the liquid environment during the pyrolysis should be maintained below 100° C. as the said "limiting" temperature, and preferably below 70° C.; no advantage appears to accrue in maintaining the temperature below 50° C. It has also been found that the pyrolysis temperature for α-pinene should be at least 500° C. to minimise the formation of dipentene and a temperature of 500° C. to 700° C. is preferred since too high a temperature increases the proportion of allo-ocimene produced by isomerisation. Thus, when an electrically heated filament is employed as heating element, this should be heated until it glows a cherry-red colour. Furthermore, it has been found that the partial pyrolysis should be carried out to a conversion of the α-pinene in the liquid environment not greater than 40%, and preferably not greater than 25%, by weight; and that in any separation of the formed ocimene by fractional distillation the distillation should be carried out at a sub-atmospheric pressure of less than 50 mm., preferably less than 35 mm. of mercury if appreciable isomerisation of the ocimene to allo-ocimene is not to occur.

Accordingly, the present invention consists in an improved method for the preparation of ocimene, which comprises partially pyrolysing α-pinene with the aid of an element heated to at least 500° C., preferably at 500° C. to 700° C., and immersed in a liquid environment containing the α-pinene, the temperature of the bulk of the liquid environment being maintained below 100° C., preferably at 50° to 70° C., and the pyrolysis being carried out to a conversion of the α-pinene present in the environment which is not greater than 40%, preferably not greater than 25%, by weight; preferably, the bulk of the liquid environment is maintained under such reduced pressure that it is in a condition of ebullition.

The separation of the formed ocimene from unreacted α-pinene and the other pyrolysis products inevitably formed, though in smaller yield than obtained by the prior art processes, is conveniently carried out by fractional distillation under such temperature and reduced pressure that appreciable isomerisation of the ocimene does not occur. This requires a sub-atmospheric distillation pressure of less than 50 mm. of mercury, and preferably one less than 35 mm. of mercury. The order of boiling of the components in the pyrolysed reaction mixture is α-pinene, dipentene, ocimene and allo-ocimene. Complete separation of the dipentene and ocimene from each other can be achieved in an efficient still although their boiling points differ only by about 3.5° C. at 20 mm. However, isolation of a distillate fraction which is a mixture of about 80% ocimene and about 20% dipentene is very readily achieved with less efficient distillation units and this degree of purification of ocimene is often sufficient, for example if the ocimene is to be used in perfumery; moreover, many chemical reactions on ocimene can be carried out satisfactorily using this mixture.

The present pyrolysis of α-pinene can be very conveniently operated on a semi-continuous basis in the apparatus hereinbefore described, using any one of the forms of reaction chamber therein illustrated. The α-pinene and its pyrolysis products may be continuously refluxed from a fractionating pot which is in the separating zone, and causing a portion of the condensing liquid, which is predominantly α-pinene since this is the lowest boiling component, to flow through the reaction chamber. In this chamber there is the heated element which is immersed in the liquid admitted to the chamber and this liquid is maintained below the "limiting" temperature by external or internal cooling and/or by arranging that the pressure in the chamber is such that the liquid is maintained at reflux temperature in which case the reaction chamber is fitted with a reflux condenser. The latter method of cooling is preferred since then the liquid environment is maintained in the desirable condition of ebullition. In addition there is arranged a continuous bleed from the reaction chamber by which the mixture of unreacted α-pinene and the pyrolysis products are returned to the separation zone from which α-pinene, since it has a lower boiling point than the pyrolysis products, is preferentially distilled. In this semi-continuous manner the initial quantity of α-pinene present in the reaction system is continuously recycled through the reaction chamber and the pyrolysis products accumulate in the fractionator pot, that is in the separation zone. The residence time for α-pinene in the reaction chamber during each cycle is preferably about 10 minutes.

The refluxing liquid in the said separation zone is, of course, under sub-atmospheric pressure of less than 50 mm. of mercury in order to prevent appreciable isomerisation of the ocimene from occurring. This reduced pressure can be the same as or different from the pressure pertaining in the reaction chamber. The boiling point of α-pinene is 76.8° C. at 60 mm., 66.8° C. at 40 mm. and 51.4° C. at 20 mm. When the pyrolysis is substantially complete, as shown by the increase in boiling point of the liquid distilling from the refluxing zone, the semi-continuous process is terminated and the reaction mixture subjected to fractional distillation under sub-atmospheric pressure to separate the ocimene from allo-ocimene and, if desired, also from the dipentene. The duration of the pyrolysis reaction in such a semi-continuous process depends on many factors but is normally at least 8 hours and may be as high as 500 hours.

In the completely continuous procedure it is arranged that the recycling mixture of unreacted α-pinene and the pyrolysis products is continuously subjected to fractional distillation by replacing the refluxing zone of the semi-continuous procedure by a fractionating column. In this way it is arranged that only the lowest boiling fraction consisting essentially of α-pinene, enriched as necessary from a fresh supply of α-pinene, is circulated to the reaction chamber.

For the pyrolysis of α-pinene we have found that an optimum current is one giving about 200 watts per square inch of element surface. The current in the element is usually A.C. of low voltage, for instance from 10 to 30 volts, which with a filament of length 6–12 inches requires a current of up to 10 amps. Very suitable filaments are one of "Nichrome" wire from 20 to 32 S.W.G.

The ocimene which is prepared according to the preferred aspect of the invention finds use in perfumery applications and also as a chemical intermediate in the production of other terpenic compounds and derivatives. For instance, it may be reacted with hydrogen bromide in the presence of a cuprous salt and the resulting allylic halide converted to an ester and saponified to yield a mixture of the valuable perfumery alcohols linalool, geraniol and nerol.

The invention is now illustrated by the following examples which illustrate the pyrolysis of α-pinene to ocimene. Unless otherwise stated all quantities are on a weight basis.

*Example 1*

The apparatus illustrated in FIG. 1 was employed. There was charged to the fractionator pot 1 α-pinene (120 parts) and this was refluxed under pressure of 25 mm. the refluxing temperature being 55° C. In the reaction chamber a Nichrome filament of 30 S.W.G. was heated to a temperature of 600° C. and the temperature of the liquid in the reaction chamber was approximately 55° C. The apparatus was run for 16 hours whereupon the refluxing temperature began to rise indicating that most of the α-pinene had been pyrolysed. The reaction mixture was then subjected to fractional distillation under vacuum in a 100 plate column and there was obtained partially racemised but otherwise unchanged α-pinene (20 parts), dipentene (27 parts), ocimene (48 parts), allo-ocimene (16.5 parts), and involatile polymer (3.5 parts), the balance being accounted for by losses during the distillation and the original presence in the α-pinene of impurities. Thus the yield of ocimene was 40% based on a pyrolysis conversion of α-pinene of 84%.

*Example 2*

The process of Example 1 was employed using the apparatus illustrated in FIGS. 2 and 3. The filament was again made of Nichrome wire of 30 S.W.G. and was maintained at 650° C. The temperature of the liquid in the reaction vessel was 60° C. and the apparatus was run for 400 hours. The resulting reaction mixture was colourless and when analysed by vapour phase chromatography was shown to consist of approximately 36% ocimene, 14.5% allo-ocimene, 20.5% dipentene, 22% unchanged α-pinene, the remainder being other terpenic compounds and polymeric material. This mixture was fractionally distilled under vacuum to obtain a mixture of 80% ocimene and 20% dipentene which was not purified further. Thus ocimene was obtained in a yield of 46.5% based on a pyrolysis conversion of α-pinene of 78%.

*Example 3*

A reaction chamber was constructed from a horizontal tube of length 18 inches and diameter 3 inches. Along the length of the lower half of the tube were suspended eighteen filamentary elements of 30 S.W.G. "Nichrome" wire each of length 14 inches and along the length of the upper half of the tube a number of cooling tubes through which circulated cold water. Through this reaction chamber there was passed a stream of α-pinene at a flow rate of 4.5 litres per hour in such manner that the tube was maintained half full of liquid and with the "Nichrome" heating elements beneath the liquid surface. The vapour space above the liquid was maintained at a pressure of 25 mm. mercury and a current of 4.35 amps. passed through the elements. The emergent liquid from the reaction chamber was analysed by vapour phase chromatography and found to contain 77% α-pinene, 8.7% dipentene, 9.9% ocimene and 4.4% allo-ocimene. Thus, this match procedure of carrying out the invention resulted in a yield of ocimene of 43% based on a conversion of α-pinene of 23% in the single passage through the reaction chamber.

What I claim is:
1. A method for the preparation of ocimene which comprises placing a liquid consisting essentially of α-pinene in a reaction chamber having a heating element beneath the liquid level therein thereby providing the said element with a liquid environment, heating the said element to at least 500° C. while maintaining the bulk of the said liquid environment below 100° C., whereby pyrolysis of the α-pinene is carried out to a conversion of the α-pinene present in the said liquid environment which is not greater than 40% by weight; and separating the unchanged α-pinene from the formed ocimene.

2. A method as claimed in claim 1 in which the bulk of the said liquid environment is also maintained under such reduced pressure that it is in a condition of ebullition.

3. A method as claimed in claim 1, in which the bulk of the said liquid environment is maintained at 50° C. to 70° C.

4. A method for the preparation of ocimene which comprises passing a liquid consisting essentially of α-pinene through a reaction chamber having an element heated to a temperature of at least 500° C. and situated beneath the liquid level therein, the said liquid providing a liquid environment for the heated element, the bulk of which is maintained at a temperature below 100° C. and under such reduced pressure that it is in a condition of ebullition, whereby a pyrolysis of the α-pinene is carried out to a conversion of the α-pinene present in the environment which is not greater than 40% by weight; passing the resulting mixture comprising unchanged α-pinene and ocimene to a separation zone wherein unchanged α-pinene is separated therefrom by a process of fractional distillation at a sub-atmospheric pressure of less than 50 mm. of mercury; and recycling the α-pinene so separated to the reaction chamber.

5. A method as claimed in claim 4, in which the bulk of the said liquid environment is maintained at 50° C. to 70° C.

6. A method as claimed in claim 4, in which the said process of fractional distillation is carried out at a sub-atmospheric pressure of less than 35 mm. of mercury.

7. A method for the preparation of ocimene which comprises passing a liquid consisting essentially of α-pinene through a reaction chamber having a heating element beneath the liquid level therein, said element being composed of at least one filament of "Nichrome" wire of from 20 to 32 S.W.G. disposed substantially horizontally within the chamber and being heated to a temperature of from 500° C. to 700° C., the said liquid providing a liquid environment for the said element, the bulk of said environment being maintained at a temperature of from 50° C. to 70° C. and under such reduced pressure that it is in a condition of ebullition, whereby a pyrolysis of the α-pinene is carried out to a conversion of the α-pinene present in the environment which is not greater than 25% by weight; passing the resulting mixture comprising unchanged α-pinene and ocimene to a separation zone wherein unchanged α-pinene is separated therefrom by a process of fractional distillation at a sub-atmospheric pressure of less than 35 mm. of mercury; and recycling the α-pinene so separated to the reaction chamber.

References Cited by the Examiner

UNITED STATES PATENTS

| | | | |
|---|---|---|---|
| 2,190,369 | 2/1940 | Rice | 260—683 |
| 2,437,759 | 3/1948 | Savich et al. | 260—677 |
| 2,444,790 | 7/1948 | Rummelsberg | 260—677 |

OTHER REFERENCES

Hawkins et al.: Journal of the American Chemical Society, vol. 73, pp. 5379–81, 1951.

Hawkins et al.: Journal of Organic Chemistry, vol. 24, pp. 1507–11, 1959.

DELBERT E. GANTZ, *Primary Examiner.*

C. E. SPRESSER, *Assistant Examiner.*